United States Patent
Lu et al.

(10) Patent No.: US 10,920,056 B2
(45) Date of Patent: *Feb. 16, 2021

(54) LOW DENSITY POLYOLEFIN RESINS WITH STIFFNESS, IMPACT BALANCE, AND HIGH DIMENSIONAL STABILITY

(71) Applicant: EQUISTAR CHEMICALS, LP, Houston, TX (US)

(72) Inventors: Jue Lu, Lansing, MI (US); Changlai Yang, Lansing, MI (US); Michael J. Dammann, Lansing, MI (US)

(73) Assignee: Equistar Chemicals, LP, Houston, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/441,745

(22) Filed: Jun. 14, 2019

(65) Prior Publication Data

US 2019/0382568 A1    Dec. 19, 2019

Related U.S. Application Data

(60) Provisional application No. 62/686,324, filed on Jun. 18, 2018.

(51) Int. Cl.
| | | |
|---|---|---|
| *C08L 23/12* | (2006.01) | |
| *C08L 23/08* | (2006.01) | |
| *C08L 23/16* | (2006.01) | |
| *C08L 53/00* | (2006.01) | |
| *B29B 9/10* | (2006.01) | |

(52) U.S. Cl.
CPC ........... *C08L 23/12* (2013.01); *C08L 23/0815* (2013.01); *C08L 23/16* (2013.01); *C08L 53/00* (2013.01); *B29B 9/10* (2013.01); *C08L 2205/035* (2013.01)

(58) Field of Classification Search
CPC ...... C08L 23/16; C08L 23/14; C08L 23/0815; C08L 53/00; C08L 23/12; C08L 2205/035; C08K 3/34; B29B 9/10
See application file for complete search history.

(56) References Cited

U.S. PATENT DOCUMENTS

| | | | |
|---|---|---|---|
| 9,902,846 B2 * | 2/2018 | Glenister et al. ........ | C08L 53/02 |
| 10,358,547 B2 * | 7/2019 | Glenister et al. ........ | C08K 3/00 |
| 2018/0016428 A1 | 1/2018 | Glenister et al. | |

FOREIGN PATENT DOCUMENTS

| | | |
|---|---|---|
| EP | 2495280 A1 | 9/2012 |
| WO | 2013026864 A1 | 2/2013 |
| WO | 2016033188 A1 | 3/2016 |

OTHER PUBLICATIONS

International Search Report and Written Opinon dated Sep. 23, 2019 (Sep. 23, 2019) for Corresponding PCT/US2019/037272.

* cited by examiner

*Primary Examiner* — Nathan M Nutter

(57) ABSTRACT

Low density polyolefin compositions with improved stiffness, impact balance, and high dimensional stability are described. These compositions are useful for making automotive components, such as injection molded parts, as well as other articles of manufacture. The compositions comprise (a) a polyolefin comprising polypropylene, a propylene-ethylene block copolymer, or combinations thereof, wherein the polyolefin blend is present in an amount ranging from about 55 wt. % to about 72 wt. %; (b) a first elastomer and a second elastomer that are not the same, wherein the combined weight percent of components (b) ranges from about 18 wt. % to about 33 wt. %; (c) a filler present in an amount ranging from about 6 wt. % to about 12 wt. %; and (d) an additive package present in an amount ranging from about 0.5 wt. % to about 5 wt. %, all wt. % are based on the total weight of the composition.

17 Claims, No Drawings

LOW DENSITY POLYOLEFIN RESINS WITH STIFFNESS, IMPACT BALANCE, AND HIGH DIMENSIONAL STABILITY

CROSS-REFERENCE TO RELATED APPLICATIONS

This application is the Non-Provisional Patent Application, which claims benefit of priority to U.S. Provisional Application No. 62/686,324, filed Jun. 18, 2018, the contents of which are incorporated herein by reference in their entirety.

FIELD OF THE DISCLOSURE

The disclosure relates to polyolefin compositions, specifically, polyolefin compositions for automotive applications, including injection molded parts.

BACKGROUND OF THE DISCLOSURE

Polyolefins have been used in commercial plastics applications because of their wide ranging physical properties and processability. These polymers can be either amorphous or highly crystalline, and they are able to behave as thermoplastics, thermoplastic elastomers, or thermosets. As such, polyolefins may be designed and modified for select applications by selecting their molecular structure and molecular weight distribution(s) to obtain a balance of stiffness, impact resistance and processability in the extrusion processes.

Polypropylene and polyethylene, in particular, have been used in the automotive industry. Because of their impact resistance and ability to withstand weather extremes, blends of polypropylene and ethylene-α-olefin copolymer elastomers and plastomers have found use in injection molded structures, including those in the automotive industry such as bumpers, fascias, and interior panels for automotives, airplanes, and recreational vehicles, as well as other components for water vessels and locomotives.

It is an object of the present disclosure to achieve weight reductions in the polyolefin-based compositions used in commercial applications (such as automotive applications in the air, sea and land) without compromising their critical properties and maintaining its processability. It is also an object of the present disclosure to reduce or maintain the compositions' coefficient of linear thermal expansion (CLTE), shrinkage, and gap closure, balanced with the reduction in density and/or removal of higher weight filler content in the polyolefin compositions as well as the strength, flexibility and processability properties.

SUMMARY OF THE DISCLOSURE

The present disclosure is directed to new polyolefin compositions that address the need for injection molded parts with lower density and improved physical properties for automotive parts, and methods of forming the articles from such compositions.

In particular, one aspect of the present disclosure is novel compositions having (a) a polyolefin comprising polypropylene homopolymer, a propylene-ethylene block copolymer, or combinations thereof, wherein the polyolefin is present in an amount ranging from about 55 wt. % to about 72 wt. %, based on a total weight of the composition; (b) a first and second elastomer, wherein the combined weight percent of the first elastomer and the second elastomer ranges from about 18 wt. % to about 33 wt. %, based on the total weight of the composition; (c) a filler present in an amount ranging from about 6 wt. % to about 12 wt. %, based on the total weight of the composition; and (d) an additive package present in an amount ranging from about 0.5 wt. % to about 5 wt. %, based on the total weight of the composition.

The novel compositions have a density ranging from about 0.92 to about 0.99 g/cm$^3$, an after-bake-mold-shrinkage (1.0 hours, 121° C.) ranging from about 0.7 percent to about 0.9 percent, a coefficient of linear thermal expansion ranging from about 5 to about 8 (10E-5 mm/mm/° C.), and a flexural modulus between about 1,400 MPa and about 2,500 MPa.

The novel compositions also have a 100% ductile failure under multiaxial impact at −30° C. without paint. With either a single layer of both basecoat and clearcoat or a single layer of white with two recoats, applied to the composition per standard painting techniques for the automotive industry, the compositions have a 100% ductile failure at 0° C. with an impact speed of 2.2 m/s.

The novel compositions differ from prior compositions with attempted reduction of density of polyolefins while maintaining the desired properties. Prior efforts in e.g. U.S. Pat. No. 9,902,846 relied on compatibilizers between the polypropylene and the ethylene-based copolymers to tailor the properties of stiffness, impact balance, or high dimensional stability of the final injection molded part, for example. The presently disclosed compositions, by contrast, use dual elastomers only, not compatibilizers, with a selection of polypropylene homopolymers (homo-PP) and polypropylene block copolymers to achieve comparable properties with much reduced cost.

The present disclosure further comprises articles made from the above novel compositions that may be used as parts for automobiles, water vessels, locomotives, recreational vehicles, or airplanes, and methods of making such. In particular, the compounds in (a), (b), (c), and (d) may be melt blended together or blended with an extruder before being injection molded into the desired articles. Alternatively, the compounds in (a), (b), and (c) may be melt blended together before the additives in (d) are added during the extrusion process.

While multiple embodiments are disclosed, still other embodiments will become apparent to those skilled in the art from the following detailed description. As will be apparent, certain embodiments, as disclosed herein, are capable of modifications in various aspects, all without departing from the spirit and scope of the claims as presented herein. Accordingly, the drawings and detailed description are to be regarded as illustrative in nature and not restrictive.

DETAILED DESCRIPTION OF THE DISCLOSURE

Provided herein are polyolefin-based compositions that do not rely on compatibilizers to tailor the physical properties needed for injection molded automotive articles. Specifically, dual elastomers and a selection of polypropylene homopolymers and polypropylene-ethylene block copolymers are used to reduce the density of the molded article while maintaining or improving the desired properties. In some embodiments, these compositions have a reduced density while maintaining or improving one or more of the following properties of a higher density resin: CLTE, low shrinkage, and dimensional stability. Further, the novel composition can be injection molded into articles of any shape and size, especially relatively large articles like automobile bumpers. By using a dual elastomer system and an easily processed olefin, costs are greatly reduced.

In one aspect of the present disclosure, there are provided compositions comprising:
(a) a polyolefin comprising polypropylene homopolymer, a propylene-ethylene block copolymer, or combinations thereof, wherein the polyolefin is present in an amount ranging from about 55 wt. % to about 72 wt. %, based on a total weight of the composition;
(b) a first and second elastomer, wherein the combined weight percent of the first elastomer and the second elastomer ranges from about 18 wt. % to about 33 wt. %, based on the total weight of the composition;
(c) a filler present in an amount ranging from about 6 wt. % to about 12 wt. %, based on the total weight of the composition; and
(d) an additive package present in an amount ranging from about 0.5 wt. % to about 5 wt. %, based on the total weight of the composition;
wherein the composition has a density ranging from about 0.92 to about 0.99 g/cm$^3$, an after-bake-mold-shrinkage (1 hours, 121° C.) ranging from about 0.7 percent to about 0.9 percent, a coefficient of linear thermal expansion ranging from about 5 to about 8 (10E-5 mm/mm/° C.), a flexural modulus between about 1,400 MPa and about 2,500 MPa, and a 100% ductile failure under multiaxial impact at a speed of 2.2 m/s at −30° C. without paint. Automotive applications require ductile tests be performed on compositions with three coats of paint. With either a single layer of both basecoat and clearcoat, or a single layer of white with two recoats, the compositions have a 100% ductile failure at 0° C. with an impact speed of 2.2 m/s.

In some embodiments, the composition has a melt flow rate (MFR, ASTM D1238, 230° C., 2.16 kg) from about 15 g/10 min to about 50 g/10 min; alternatively from about 18 g/10 min to about 40 g/10 min; and alternatively from about 20 g/10 min to about 38 g/10 min.

In some embodiments, the composition has a density from about 0.92 g/cm$^3$ to about 0.99 g/cm$^3$. In some of these embodiments, the composition has a density from about 0.94 g/cm$^3$ to about 0.97 g/cm$^3$.

In some embodiments, the composition has a coefficient of linear thermal expansion (CLTE) from about 5 (10$^{-5}$ mm/mm/° C.) to about 8 (10$^{-5}$ mm/mm/° C.); alternatively from about 5.5 (10$^{-5}$ mm/mm/° C.) to about 7 (10$^{-5}$ mm/mm/° C.), wherein the mean secant values of the CLTE over the temperature range of −30° C. to 100° C., with the representative temperature of 35° C. are determined and reported.

The composition has a Charpy notched impact strength that measures from about 25 kJ/m$^2$ to about 60 kJ/m$^2$ at 23° C. Alternatively, the Charpy notched impact strength at 23° C. is from about 30 kJ/m$^2$ to about 55 kJ/m$^2$. In yet another alternative, the Charpy notched impact strength at 23° C. is from about 35 kJ/m$^2$ to about 50 kJ/m$^2$. In some embodiments, the composition has a Charpy notched impact strength at −30° C. ranging from about 2 kJ/m$^2$ to about 10 kJ/m$^2$. In yet other embodiments, the composition has a Charpy notched impact strength at −30° C. from about 3 kJ/m$^2$ to about 6 kJ/m$^2$.

In some embodiments, the composition has a flexural modulus between about 1,400 MPa and about 2,500 MPa; alternatively between about 1,500 MPa and about 2,200 MPa; and alternatively between about 1550 MPa and about 2,100 MPa.

In some embodiments, the composition has 100% ductile failure under multiaxial impact at a speed of 2.2 m/s at −30° C. (ASTM D3763) without paint. Alternatively, the composition has a ductility range of about 80-100% at 0° C. under multiaxial impact at a speed of 2.2 m/s when the composition has been painted using standard techniques for the automotive industry for bumper fascia, for example. Such standard techniques include single coats of both a basecoat and a clearcoat or a white layer with two recoats. Alternatively, the composition has a ductility of 100% at 0° C. under multiaxial impact at a speed of 2.2 m/s when the composition has been painted using standard techniques for the automotive industry.

In some embodiments, the as-molded shrinkage ("AMMS") of the composition ranges from about 0.4% to about 0.8%. In some embodiments, the as-molded shrinkage of the composition is from about 0.5% to about 0.8%; alternatively from about 0.5% to about 0.7%. In accordance with some embodiments of the present disclosure, the as-molded shrinkage may be measured using a modified ISO-294-4 method, wherein the method was modified by molding a 4×6×⅛ inch plaque comprising the composition, allowing the plaque to cool to room temperature and re-condition for over 24 hours, and measuring the average shrinkage utilizing a fixed gauge.

In some embodiments, the after-bake-mold-shrinkage ("ABMS") (1 hours, 121° C.) of the composition ranges from about 0.5% to about 1.0%, alternatively from about 0.6% to about 1.0%; alternatively from about 0.6% to about 0.9%; and alternatively from about 0.7% to about 0.9%. The after-bake-mold-shrinkage may be measured using a modified ISO-294-4 method, wherein the method was modified by baking a molded 4×6×⅛ inch plaque of the sample composition to a set temperature of 121° C. for an hour, and measuring the average shrinkage after it is returned to room temperature and re-conditioned (i.e., allowed to stabilize by leaving it at room temperature and a controlled humidity for over 24 hours) utilizing a fixed gauge.

I. Polyolefin

In some embodiments, the polyolefin is present in an amount ranging from about 55 wt. % to about 72 wt. %, based on the total weight of the composition. In some of these embodiments, the polyolefin is present in an amount of about 58 wt. %, based on the total weight of the composition. In some embodiments, the polyolefin comprises one or more polypropylene homopolymers having high crystallinity portions. "High crystallinity" refers to polypropylene with a percentage of mesopentad greater than 97% mmmm, as determined by high field NMR. See for example, WIPO PCT Patent Application Publication No. WO 2009/045351, which is incorporated herein by reference. In some of these embodiments, the polyolefin has a melt flow rate (MFR, ASTM D1238, 230° C., 2.16 kg) from about 40 g/10 min to about 90 g/10 min; alternatively from about 50 to about 80 g/10 min; alternatively from about 50 to about 75 g/10 min; and alternatively from about 50 to about 60 g/10 min.

In alternative embodiments, the polyolefin is a blend of two or more polypropylene homopolymers, or propylene-ethylene block copolymers. In yet other embodiments, the polyolefin is a blend of one or more polypropylene homopolymers, or propylene-ethylene block copolymers. In the alternative embodiment, the total polyolefin is present in an amount ranging from about 58 wt. % to about 72 wt. %, based on a total weight of the composition. In some of these embodiments, the total polyolefin is present in an amount of about 62 wt. % to about 70 wt. %, based on a total weight of the composition. In some of these embodiments, the blended polyolefin has a combined melt flow rate (MFR, ASTM D1238, 230° C., 2.16 kg) of from about 10 g/10 min to about 80 g/10 min; alternatively from about 20 to about 60 g/10 min; alternatively from about 20 to about 50 g/10 min; and alternatively from about 20 to about 40 g/10 min. Accordingly, additional polyolefins having melt flow rates higher than those disclosed herein or lower than those disclosed herein may be utilized with the present olefin compositions in order to obtain a blended polyolefin having the above melt flow rate ranges.

In some embodiments, the polyolefins include commercially available polypropylenes, including without limitation ADSTIF™, METOCENE™, and PROFAX™, each available from LyondellBasell Industries (Houston, Tex., USA); or polypropylene homopolymers from Braskem (Philadelphia, Pa., USA).

II. Elastomers

The present compositions utilize a dual elastomer without a compatibilizer, wherein the two elastomers are not the same. In some embodiments, the dual elastomers of the compositions provided herein have the following properties and are present in the amounts indicated below:

(i) the first elastomer comprises an ethylene-based copolymer having a density from about 0.86 g/cm$^3$ to about 0.88 g/cm$^3$, wherein the first elastomer is present in an amount ranging from about 5 wt. % to about 15 wt. %, based on the total weight of the composition; and (ii) a second elastomer comprising an ethylene-octene copolymer having a density from about 0.85 g/cm$^3$ to about 0.87 g/cm$^3$ and a glass transition temperature below −60° C., wherein the second elastomer is present in an amount ranging from about 10 wt. % to about 22 wt. %, based on the total weight of the composition.

The combined weight percent of the first elastomer and the second elastomer may range from about 18 wt. % to about 33 wt. %, based on the total weight of the composition. In some embodiments, the first elastomer may be present in an amount ranging from about 5 wt. % to about 15 wt. %, alternatively from about 5 wt. %, to about 12 wt. %, based on the total weight of the composition. The second elastomer may be present in an amount ranging from about 18 wt. % to about 22 wt. %; alternatively from about 20 wt. % to about 21 wt. %, based on the total weight of the composition. In alternative embodiments, the second elastomer is present in an amount ranging from about 8 wt. % to about 15 wt. %; alternatively from about 10 wt. % to about 12 wt. %, based on the total weight of the composition.

The first elastomer may also have a melt flow rate (190° C., 2.16 kg) from about 0.4 g/10 min to about 2 g/10 min; alternatively from about 0.4 g/10 min to about 1.0 g/10 min. Alternatively, the first elastomer has a melt flow rate (190° C., 2.16 kg) from about 3 g/10 min to about 8 g/10 min; and alternatively about 5 g/10 min. In some embodiments, the ethylene-based copolymer of the first elastomer is an ethylene-butene copolymer or an ethylene-octene copolymer.

The second elastomer may have a melt flow rate (190° C., 2.16 kg) from about 3 g/10 min to about 8 g/10 min, alternatively about 5 g/10 min.

Suitable elastomers are commercially available from ExxonMobil Corporation under its Vistamaxx® brand, The DOW Chemical Company under its Engage® brand, and Mitsui Chemicals, Inc. under its Tafmer® brand.

III. Fillers

In some embodiments, the filler is present in an amount ranging from about 6 wt. % to about 12 wt. %, alternatively from about 7 wt. % to about 11 wt. %, alternatively from about 8 wt. % to about 10 wt. %, and alternatively about 9 wt. %, where each range and percentage is based on the total weight of the composition. In some embodiments, the filler may be selected from a talc having a high aspect ratio, glass, glass bubbles, carbon fibers, mineral fibers, biofillers such as wood, flax, wheat straw, coconut, kenaf, and hemp, and combinations thereof (such as talc with glass bubbles or talc with carbon fibers).

The filler can be added to the composition directly, optionally while the composition is being blended or extruded, such that the filler is distributed approximately evenly throughout the composition.

IV. Additive Packages

In some embodiments, the additive package may comprise one or more of the following: antioxidant(s); mold release(s); scratch reduction additive(s); nucleating agent(s); neutralizer(s)/acid scavenger(s) selected from the group consisting of magnesium aluminum hydroxyl carbonate and hydrates thereof; and stearic acid and/or a stearate salt.

In some embodiments, the additive package comprises an antioxidant, wherein the antioxidant is an organophosphite or a blend of more than one organophosphite.

In some embodiments, the scratch reduction additive may include lubricants such as fatty amides; examples of which include oleamide ("OR"), ethylene bis-steramide (EB S), and/or erucamide, and the like. For example, the oleamide (OR) may be Crodamide® OR supplied by Croda, Inc (Newark, N.J.); the erucamide (ER) may be Crodamide® ER supplied by Croda; and the ethylene bis-steramide (EBS) may be Crodamide® EBS supplied by Croda.

In some embodiments, the mold release additive may include one or more of glycerol monostearate, stearic acid, a stearate salt, magnesium stearate, calcium stearate, and the like. See, for example, U.S. Pat. No. 3,886,105, which is incorporated herein by reference for all purposes. Alternatively, magnesium stearate may be used as a dispersion aid.

In some embodiments, the additive package comprises a nucleating agent, wherein the nucleating agent is a phosphate ester salt such as sodium phosphate. In alternative embodiments, the additive package comprises a nucleating agent, wherein the nucleating agent is cyclohexanedicarboxylic acid, a salt thereof, or an anhydride thereof. In some embodiments, the nucleating agent is present in an amount ranging from about 0.05 wt. % to about 1 wt. %; alternatively about 0.05 wt. % to about 0.3 wt. %, based on the total weight of the composition. In some of these embodiments, the nucleating agent is present in an amount of about 0.1 wt. %, based on the total weight of the composition.

In some embodiments, the additive package comprises a neutralizer/acid scavenger, wherein the neutralizer/acid scavenger is magnesium aluminum hydroxy carbonate or hydrates thereof. Magnesium aluminum hydroxy carbonate hydrates are effective in retarding hindered amine light stabilizer deactivation. One magnesium aluminum hydroxy carbonate hydrate for use with the present disclosure is sold under the trademark "DHT-4A or DHT-4V" by Kyowa Chemical Industry Co. Ltd.

In some embodiments, the additive package further comprises one or more of the following type of substances: colorants, odorants, deodorants, plasticizers, impact modifiers, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agents, blowing agents, emulsifiers, crosslinking agents, waxes, particulates, flow promoters, and other materials added to enhance processability or end-use properties of the polymeric components. Such additives may be used in conventional amounts. In some embodiments, the amounts do not exceed 10 wt. % of the total weight of the composition.

In some embodiments, the additives are added individually (or in combination) to the composition directly, optionally while the composition is being blended or extruded, such that the additives are distributed approximately evenly throughout the composition. This type of additive addition may be called a "salt and pepper addition." In other embodiments, the additives may be added using a masterbatch. A masterbatch pre-blends (or entrains) additives into a carrier that is blendable with the polyolefin composition Here, the carrier may be a homopolymer of polyethylene or polypropylene, or a talc. When talc is used as the carrier, equivalent amount of filler is reduced in the formula. The masterbatch may be added while the composition is being blended or extruded such that the additives are distributed approximately evenly throughout the composition.

One or more masterbatches may be used to introduce the additives to the compositions. In some embodiments, multiple masterbatches may carry different additives. For example, a first masterbatch may carry a colorant and a second masterbatch may carry the remainder of the additives. In embodiments using multiple masterbatches, the polymer carrier of each masterbatch may be the same or different. Regardless of the number of masterbatches used, the combined polymer carrier resin may be limited to 0.5-2 wt. % of the total weight of the composition; alternatively, the polymer carrier may be about 1 weight percent of the total weight of the composition.

In still further embodiments, some of the additives may be added via a masterbatch route and other additives may be added via a salt and pepper addition.

V. Molded Parts/Articles

In another aspect, there are provided articles of manufacture comprising one or more of the compositions disclosed herein. In some embodiments, the article is a part of an automobile, such as a molded part but may also include water vessels, locomotives, recreational vehicles, airplanes and other products. In some embodiments, the molded part is a bumper fascia, a bumper, a rocker, a cladding, a wheel flare, a door panel, or an instrument panel. In some embodiments, such molded parts may be used to assist the automotive industry in their pursuit of manufacturing lower weight cars with improved fuel efficiency and lower emissions. In some embodiments, the molded parts disclosed herein exhibit a property profile of current higher density compositions, e.g., those used for current bumper fascia resins. Such properties include, for example, consistent shrinkage and CLTE properties, while exhibiting a reduced density. In contrast to other lower density compositions known in the art, the compositions provided herein do not reduce stiffness or impact at room temperature or below, e.g. −30° C. Additionally, compositions provided herein do not result in an increase in CLTE or shrinkage. In some embodiments, the compositions (resins) provided herein are compatible with existing tooling and would therefore not require any or only limited retooling expense. The auto industry is pursuing reduced gapping for improved craftsmanship, thus some embodiments include compositions that contrast with other low density compositions by avoiding any increase in expansion/contraction gapping.

In some embodiments, the articles may include embedded colorants. In alternative embodiments, the articles may be semi-finished in that they still need to undergo coloring, painting, or sealing after (or before) being molded. In further embodiments, the articles may be coated with various materials to facilitate paintability. In still further embodiments, the articles may be coated with a clear seal or wax (before, after, or instead of being painted). The clear seal, wax, and/or paint (alone or in combination) may protect the article from elements such as sun, heat, wind, rain, road debris including dirt and bugs, tree pollen or sap, and/or bird droppings.

VI. Methods and Process

Another aspect of the invention are methods of making an injection molded part (e.g., of an automobile) comprising melt blending the constituents (a), (b), (c), and (d):

(a) a polyolefin comprising polypropylene homopolymers, a propylene-ethylene block copolymer, or combinations thereof, wherein the polyolefin is present in an amount ranging from about 55 wt. % to about 72 wt. %, based on a total weight of the composition;

(b) a first and second elastomer, wherein the combined weight percent of the first elastomer and the second elastomer ranges from about 18 wt. % to about 33 wt. %, based on the total weight of the composition;

(c) a filler present in an amount ranging from about 6 wt. % to about 12 wt. %, based on the total weight of the composition; and (d) an additive package present in an amount ranging from about 0.5 wt. % to about 5 wt. %, based on the total weight of the composition, wherein the composition has a density ranging from about 0.92 to about 0.99 g/cm$^3$, an after-bake-mold-shrinkage (1 hours, 121° C.) ranging from about 0.7 percent to about 0.9 percent, a coefficient of linear thermal expansion ranging from about 5 to about 8 ($10^{-5}$ mm/mm/° C.), a flexural modulus between about 1,400 MPa and about 2,500 MPa, and a 100% ductile failure under multiaxial impact at a speed of 2.2 m/s at −30° C. without paint. When painted per industrial standards for automotive applications, the 100% ductile failure occurs at 0° C.

In some embodiments, the methods comprise pelletizing the melt blend to form a plurality of pellets. In some embodiments, the methods comprise injection molding the pelletized blend. In some embodiments, the constituents are blended with an extruder such as a high-intensity continuous mixer or an internal batch mixer (Banbury mixer, or a twin-screw extruder).

VII. Definitions

As used herein, the term "α-olefin" or "alpha-olefin" means an olefin of the general formula CH2=CH—R, wherein R is a linear or branched alkyl containing from 1 to 10 carbon atoms. The α-olefin can be selected, for example, from propylene, 1-butene, 1-pentene, 1-hexene, 1-octene, 1-dodecene and the like.

As used herein, the term "elastomer" refers to polymer compounds having rubber-like properties and crystallinity in the range of from about 0 percent to about 20 percent. In some embodiments, the polymer can have crystallinity in the range of from about 0 percent to about 5 percent.

As used herein, the term "heterophasic polypropylene copolymer" refers to a copolymer (or rubber copolymer) prepared by the copolymerization of ethylene and propylene dispersed into a polypropylene matrix. The polypropylene matrix may be a homopolymer or a copolymer.

As used herein, the term "homopolymer" and similar terms mean a polymer consisting solely or essentially of units derived from a single kind of monomer, e.g., ethylene homopolymer is a polymer comprised solely or essentially of units derived from ethylene, and propylene homopolymer is a polymer comprised solely or essentially of units derived from propylene, and the like.

As used herein the term "interpolymer" refers to a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

The terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer comprises units derived from the monomers, e.g., —$CH_2$—$CH_2$—, and not the monomer itself, e.g., $CH_2$=$CH_2$.

As used herein, the term "block copolymer" refers to two or more strands (blocks) of different polymers chemically attached to each other.

As used herein the term "polymer" means a macromolecular compound prepared by polymerizing monomers of the same or different type. The term "polymer" includes homopolymers, copolymers, terpolymers, interpolymers, and so on.

As used herein, the term "polymer composition" refers to a composition made from and/or containing at least one polymer.

As used herein, the term "olefin" refers to an alkene wherein at least one carbon-carbon double bond in the molecule is a terminal double bond. Some non-limiting examples of olefins include styrene, ethylene, propylene, butene, pentene, hexene, heptene, octene, nonene, decene, or dodecene.

As used herein, the term "polyolefin" includes polymers such as polyethylene, polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes, including batch and continuous processes using single, staged or sequential reactors, slurry, solution, and fluidized bed processes and one or more catalysts including for example, heterogeneous and homogeneous systems and Ziegler-Natta, Phillips, metallocene, single-site, and constrained geometry catalysts to produce polymers having different combinations of properties. Such polymers may be highly branched or substantially linear and the branching, dispersity and average molecular weight may vary depending upon the parameters and processes chosen for their manufacture in accordance with the teachings of the polymer arts.

As used herein, the term "room temperature" refers to a temperature around 23 degrees Celsius (unless it is defined differently in an ASTM, in which case "room temperature" means as it is defined within that ASTM for that particular test/procedure/method).

As used herein, the term "thermoplastic polymer" means a polymer that softens when exposed to heat and returns to its original condition when cooled to room temperature.

As used herein, the terms "Ziegler-Natta-catalyzed polymer" and "Z-N-catalyzed polymer" mean any polymer that is made in the presence of a Ziegler-Natta catalyst.

As used herein, the term "masterbatch" refers to premixed compositions that have one or more solid or liquid additive in a carrier resin, wherein the additives are used to impart other properties to the polyolefin. One or more masterbatches can be used to introduction some or all of the additives into the polyolefin blend.

The terms "parts" and "articles" are used interchangeable herein to refer to final or semi-final injection molded components for use on e.g. automotive vehicles such as automobiles, recreational vehicles, water vessels, and airplanes.

The use of the word "a" or "an," when used in conjunction with the term "comprising" in the claims and/or the specification, may mean "one," but it is also consistent with the meaning of "one or more," "at least one," and "one or more than one."

Throughout this application, the term "about" is used to indicate that a value includes the variation of error for the device, the method being employed to determine the value, or the variation that exists among the studies.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The phrase "consisting of" is closed, and excludes all additional elements.

The phrase "consisting essentially of" excludes additional material elements, but allows the inclusions of non-material elements that do not substantially change the nature of the invention.

A "method" is a series of one or more steps undertaken that lead to a final product, result or outcome. As used herein, the word "method" is used interchangeably with the word "process."

The above definitions supersede any conflicting definition in any reference that is incorporated by reference herein. The fact that certain terms are defined, however, should not be considered as indicative that any term that is undefined is indefinite. Rather, all terms used are believed to describe the appended claims in terms such that one of ordinary skill can appreciate.

The following abbreviations are used herein:

| ABBREVIATION | TERM |
|---|---|
| ABMS | after-bake-mold-shrinkage |
| AMMS | as-molded shrinkage |
| homo-PP | polypropylene homopolymer |
| MFR | Melt mass flow range |

VIII. Testing Methods

Melt mass flow rates (MFR) are given in gram/10 min and were measured using ASTM D1238, which is entitled "Test Method for Melt Flow Rates of Thermoplastics by Extrusion Plastometer," under the conditions specified below. The term "ASTM D 1238" as used herein refers to a standard test method for determining melt flow rates of thermoplastics carried out by an extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Aug. 1, 2013 and published in August 2013, the contents of which are incorporated herein by reference in its entirety. For the referenced ASTM standards, visit the ASTM website, www.astm.org, or contact ASTM Customer Service at service@astm.org.

Filler or ash content is given in % and measured using ASTM D5630, which is entitled "Standard Test Method for Ash Content in Plastics." The term "ASTM D5630" as used herein refers to a standard test method for determining the inorganic content of plastics by destructive ashing procedures. This test method was approved on Apr. 1, 2013 and published in April 2013, the contents of which are incorporated herein by reference in its entirety. For the referenced ASTM standards, visit the ASTM website, www.astm.org, or contact ASTM Customer Service at service@astm.org.

Density is giving in g/cm$^3$ and measured using ISO 1183-1, which is entitled "Plastics-Methods for Determining the Density of Non-Cellular Plastics—Part 1: Immersion method, liquid pycnometer method and titration method." The term "ISO 1183-1" as used herein refers to the test method published as the second edition dated May 15, 2012, the content of which are incorporated herein by reference in its entirety.

Flexural modulus (or "flex modulus") is given in megapascals (MPa) and measured using ISO 178, which is entitled "Plastics—Determination of flexural properties." The term "ISO 178" as used herein refers to the test method published as the fifth edition dated Dec. 15, 2010, the content of which are incorporated herein by reference in its entirety.

Charpy notched impact strength (or "Notched Charpy Impact Strength") is given in KJ/m$^2$ and measured using ISO 179-1, which is entitled "Plastics—Determination of Charpy impact properties. Part 1: Non-instrumented impact test." The term "ISO 179" or "179-1" as used herein refers to the test method published as the second edition dated Jun. 15, 2010 (confirmed in 2015) the content of which are incorporated herein by reference in its entirety.

Multi-Axial Instrumented Impact (MAII) energy values are given in joules (J) and a percentage ductile failure mode is recorded, and measured using ASTM D3763, which is entitled "Standard Test Method for High Speed Puncture Properties of Plastics Using Load and Displacement Sensors." The term "ASTM D3763" as used herein refers to the test method was approved on Sep. 1, 2015 and published in September 2015, the contents of which are incorporated herein by reference in its entirety. For the referenced ASTM standards, visit the ASTM website, www.astm.org, or contact ASTM Customer Service at service@astm.org.

The Coefficient of Linear Thermal Expansion (CLTE) was measured by thermal mechanical analysis (TMA) of annealed test specimens cut from injection molded plaques. The mean secant values of the CLTE over the temperature range of –30° C. to 100° C., with a representative temperature of 35° C., are given in (10E-5 mm/mm/° C.). The mean secant value is the average of three data points in the flow direction and three data points in the cross flow direction. Each data point is measured using ISO 11359-2, which is entitled "Plastics—Thermomechanical analysis (TMA)—Part 2: Determination of coefficient of linear thermal expansion and glass transition temperature." The term "ISO 11359-2" as used herein refers to the test method published as the first edition dated Oct. 1, 1999 (confirmed again in 2015), the content of which are incorporated herein by reference in its entirety.

The as-molded shrinkage may be measured by molding a 4×6×⅛ inch plaque, allowing the plaque to cool to room temperature and re-condition over 48 hours, and measuring the average shrinkage utilizing a fixed gauge.

The after-bake-mold-shrinkage may be measured by heating a room temperature, molded 4×6×⅛ inch plaque to a set temperature of 121° C. for either an hour, and measuring the average shrinkage after it is returned to room temperature and re-conditioned (or allowed to stabilize by leaving it at room temperature and a controlled humidity for over 24 hours) utilizing a fixed gauge.

EXAMPLES

The following examples are included to demonstrate embodiments of the appended claims. Those of skill in the art should appreciate that many changes can be made in the specific embodiments which are disclosed and still obtain a like or similar result without departing from the spirit and scope of the disclosure herein.

Examples 1-4 were prepared using the materials as summarized in Table 1, wherein the weight percentages were calculated using the total weight of the composition. First, the additives (as indicated in Table 1) were mixed with less than 1 weight percent of talc (based on the overall composition) in a low-speed-offline-ribbon blender. The premixing may enhance distribution of the additives and help prevent agglomerations from forming with potentially tacky raw materials. Then the additive blend or package was then compounded with the remaining ingredients with a 133 mm Century TS extruder, per the processing conditions of Table 2. For each of the Examples, the filler was fed through the main feeder. For Example 1, polyolefin A was split-fed, with 25 wt. % being fed at the side feeder and 17.25 wt. % being fed at the main hopper. For Examples 2 and 3, all of polyolefin A was feed at the side feeder. The compositions of each of Examples 1-4 were compounded and extruded through a die and pelletized, before being tested in accordance with the various testing methods listed in Table 3.

TABLE 1

Compositions for Examples 1-4

| Category | Raw Materials | MFR | Condition | Density | Example 1 (wt. %) | Example 2 (wt. %) | Example 3 (wt. %) | Example 4 (wt. %) |
|---|---|---|---|---|---|---|---|---|
| Polyolefin | Polyolefin A (PP homopolymer) | 120 | 230° C., 2.16 Kg | | 42.25 | 22.25 | 22 | 34 |
| | Polyolefin B (PP homopolymer) | 2.5 | 230° C., 2.16 Kg | | 15.45 | 6 | 6 | 9.12 |
| | Polyolefin C (PP/PE block copolymer) | 18 | 230° C., 2.16 Kg | | | 40 | 41 | 20 |
| Elastomers | First Elastomer A (ethylene-butene copolymer) | 0.8 | 190° C., 2.16 Kg | 0.875 | 11.25 | | | 5.63 |
| | First Elastomer B (ethylene-butene copolymer) | 5 | 190° C., 2.16 Kg | 0.865 | | | 9.25 | |
| | First Elastomer C (ethylene-octene copolymer) | 5 | 190° C., 2.16 Kg | 0.870 | | 10 | | |
| | Second Elastomer A (ethylene-octene copolymer) | 5 | 190° C., 2.16 Kg | 0.866 | 20 | 11 | 11 | 20.5 |
| Filler | High aspect ratio talc. <3.5 um median diameter and top cut around 10 um. | | | | 9.15 | 9.00 | 9.00 | 9.00 |
| Additive Package | Antioxidant | | | | 0.30 | 0.20 | 0.20 | 0.20 |
| | Scratch aid | | | | 0.25 | 0.25 | 0.25 | 0.25 |
| | Nucleator | | | | 0.10 | 0.10 | 0.10 | 0.10 |
| | Neutralizer | | | | 0.05 | | | |
| | Dispersion aid | | | | 0.20 | 0.20 | 0.20 | 0.20 |
| Colorant | Carbon black masterbatch with PE carrier | | | | 1 | 1 | 1 | 1 |

TABLE 2

Process Conditions using 133 mm Century Twin Screw Extruder

Throughput Rate (PPH) - 12,000
Screw Speed (RPM) - 490
Extruder Amps (Average) - 1300
Vacuum level (Psia) - 6
Main Hopper (%) - see comments below
Side Feeder (%) - see comments below
Zone 1 Temperature (° F.) - 380
Zone 2 Temperature (° F.) - 390
Zone 3 Temperature (° F.) - 390
Zone 4 Temperature (° F.) - 420
Zone 5 Temperature (° F.) - 420
Zone 6 Temperature (° F.) - 400
Zone 7 Temperature (° F.) - 400
Zone 8 Temperature (° F.) - 400

TABLE 2-continued

Process Conditions using 133 mm Century Twin Screw Extruder

Screen Changer Temp (° F.) - 425
Die Temperature (° F.) - 425
Water Temperature (° F.) - 140
Screen Type - 20/80

*Example 1
talc fed at main hopper.
Split-fed the homo-PP with 120 MFR (25% fed at side feeder; 17.25% fed at main hopper)
All other resins fed at main.
*Example 2 and 3
talc fed at main hopper.
homo-PP with 120 MFR fed at side feeder.
All other resins fed at main.

TABLE 3

Characterization and results for Examples 1-4

| Properties | Method | Unit | Example 1 | Example 2 | Example 3 | Example 4 |
|---|---|---|---|---|---|---|
| Ash Content (800° C.) | ASTM D5630 | % | 9.34 | 8.82 | 8.78 | 8.58 |
| Density | ISO 1183 | g/cm$^3$ | 0.96 | 0.95 | 0.95 | 0.95 |
| Melt Mass-Flow Rate MFR (2.16 kg/230° C.) | ASTM D1238 | g/10 min | 22.3 | 22.0 | 22.8 | 26.8 |
| Flexural Modulus @ +22° C. | ISO 178 | MPa | 1647 | 1583 | 1595 | 1565 |
| Tensile Stress at Yield | ISO 527-1,2 | MPa | 21.1 | 19.9 | 19.8 | 20.5 |
| Notched Charpy at 22° C. | ISO 179 | kJ/m$^2$ | 42.5 | 49.5 | 45.3 | 45.7 |
| Notched Charpy at −30° C. | ISO 179 | kJ/m$^2$ | 4.5 | 4.0 | 4.2 | 4.3 |
| MAII −30° C. 2.2 m/s, Energy at Peak Load and % Ductility | ASTM D3763 | J, % | 21.0, 100 | 21.5, 100 | 21.7, 100 | 21.8, 100 |
| HDT, 1.8 MPa | ISO 75 | ° C. | 50.4 | 51.8 | 51.5 | |
| AMMS (24 h) | ISO-294-4 -modified by LYB as described above | mils/in | 5.36 | 5.91 | 5.71 | 5.85 |
| ABMS- 1 hr bake at 121° C. | ISO-294-4 -modified by LYB as described above | mils/in | 7.26 | 8.1 | 8.2 | 7.82 |
| With White Paint 1X, MAII 0° C., 2.2 m/s, % Ductility | ASTM D3763 | % | 100 | 100 | 100 | 100 |
| With White Paint 3X, MAII 0° C., 2.2 m/s, % Ductility | ASTM D3763 | % | 100 | 100 | 100 | 100 |

TABLE 3-continued

Characterization and results for Examples 1-4

| Properties | Method | Unit | Example 1 | Example 2 | Example 3 | Example 4 |
|---|---|---|---|---|---|---|
| CLTE (TMA), Flow (Annealed) | ISO 11359-2 | 10E−5 mm/mm/° C. | 6.23 | 6.93 | 6.58 | |
| CLTE (TMA), X-Flow (Annealed) | ISO 11359-2 | 10E−5 mm/mm/° C. | 6.42 | 6.83 | 6.92 | |

The results of the testing of each of the four samples are provided in Table 3. As shown, all four samples had physical properties that were comparable with prior compositions in U.S. Pat. No. 9,902,846 that attempted reduction of density of polyolefins by relying on compatibilizers between the polypropylene and the ethylene-based copolymers. Here, it is clear that a dual elastomer only system, with no compatibilizers, can produce resins with similar, if not better properties, for automotive applications. This change to the composition also resulted in cost savings because compatibilizers are quite costly chemicals, and because less processing time is required for the presently disclosed compositions.

All of the compositions, articles of manufacture, and methods disclosed and claimed herein can be made and executed without undue experimentation in light of the present disclosure. While the compositions, articles of manufacture, and methods of this disclosure have been described in terms of certain embodiments, it will be apparent to those of skill in the art that variations may be applied to the compositions, articles of manufacture, and methods, as well as in the steps or in the sequence of steps of the methods described herein without departing from the concept, spirit, and scope of the appended claims.

The following references, to the extent that they provide exemplary procedural or other details supplementary to those set forth herein, are specifically incorporated herein by reference for all purposes.

U.S. Pat. No. 3,886,105
U.S. Pat. No. 5,589,555
U.S. Pat. No. 6,084,042
U.S. Pat. No. 9,902,846
U.S. Patent Publication No. 2015/0045479
WIPO PCT Application No. WO2008/073401
WIPO PCT Application No. WO2009/045351
Anderson, N. G., Practical Process Research & Development—A Guide for Organic Chemists, 2nd ed., Academic Press, New York, 2012.
ASTM Standard D1238, "Test Method for Melt Flow Rates of Thermoplastics by Extrusion Plastometer," approved on Aug. 1, 2013.
ASTM Standard D5630, "Standard Test Method for Ash Content in Plastics," approved on Apr. 1, 2013.
ASTM Standard D3763, "Standard Test Method for High Speed Puncture Properties of Plastics Using Load and Displacement Sensors," approved on Sep. 1, 2015.
International Standard ISO 1183-1, "Plastics—Methods for Determining the Density of Non-Cellular Plastics—Part 1: Immersion method, liquid pycnometer method and titration method," second edition, May 15, 2012.
International Standard ISO 178, "Plastics—Determination of flexural properties," fifth edition, Dec. 15, 2010.
International Standard ISO 179-1, "Plastics—Determination of Charpy impact properties. Part 1: Non-instrumented impact test," second edition, Jun. 15, 2010.
International Standard ISO 11359-2, "Plastics—Thermomechanical analysis (TMA)—Part 2: Determination of coefficient of linear thermal expansion and glass transition temperature," first edition, Oct. 1, 1999.

What is claimed is:

1. A composition comprising:
   (a) a polyolefin comprising a polypropylene homopolymer, a propylene-ethylene block copolymer, or combinations thereof, wherein the polyolefin is present in an amount ranging from about 55 wt. % to about 72 wt. %, based on a total weight of the composition;
   (b) a first and a second elastomer that are not the same, wherein the combined weight percent of the first elastomer and the second elastomer ranges from about 18 wt. % to about 33 wt. %, based on the total weight of the composition wherein: (i) the first elastomer comprises an ethylene-based copolymer having a density from about 0.86 g/cm$^3$ to about 0.88 g/cm$^3$, wherein the first elastomer is present in an amount ranging from about 5 wt. % to about 15 wt. %, based on the total weight of the composition; and (ii) the second elastomer comprises an ethylene-octene copolymer having a density from about 0.85 g/cm$^3$ to about 0.87 g/cm$^3$ and a glass transition temperature below −60° C., wherein the second elastomer is present in an amount ranging from about 10 wt. % to about 22 wt. %, based on the total weight of the composition;
   (c) a filler present in an amount ranging from about 6 wt. % to about 12 wt. %, based on the total weight of the composition; and
   (d) an additive package present in an amount ranging from about 0.5 wt. % to about 5 wt. %, based on the total weight of the composition;
   wherein the composition has a density ranging from about 0.92 to about 0.99 g/cm$^3$, an after-bake-mold-shrinkage (1 hours, 121° C.) ranging from about 0.7 percent to about 0.9 percent, a coefficient of linear thermal expansion ranging from about 5 to about 8 (10E-5 mm/mm/° C.), and a flexural modulus between about 1,400 MPa and about 2,500 MPa.

2. The composition of claim 1, wherein the ethylene-based copolymer of the first elastomer has a melt flow rate (MFR, ASTM D1238, 190° C., 2.16 kg) from about 0.4 g/10 min to about 2 g/10 min.

3. The composition of claim 1, wherein the ethylene-based copolymer of the first elastomer has a melt flow rate (MFR, ASTM D1238, 190° C., 2.16 kg) from about 3 g/10 min to about 8 g/10 min.

4. The composition of claim 2, wherein the ethylene-based copolymer of the first elastomer is an ethylene-butene copolymer and/or an ethylene-octene copolymer.

5. The composition of claim 1, wherein the ethylene-octene copolymer of the second elastomer has a melt flow rate (MFR, ASTM D1238, 190° C., 2.16 kg) from about 3 g/10 min to about 8 g/10 min.

6. The composition of claim 1, wherein the additive package comprises one or more of the following: a nucleating agent, an antioxidant, a mold release, a scratch reduction additive, a nucleating agent, a neutralizer/acid scavenger selected from the group consisting of magnesium aluminum hydroxycarbonate and hydrates thereof; and stearic acid or a stearate salt.

7. The composition of claim 1, wherein the composition has a melt flow rate (MFR, ASTM D1238, 230° C., 2.16 kg) from about 15 g/10 min to about 50 g/10 min.

8. The composition of claim 1, wherein the composition has a density from about 0.94 g/cm$^3$ to about 0.97 g/cm$^3$.

9. The composition of claim 1, wherein the composition has a coefficient of linear thermal expansion (CLTE) from about 5.5 (10$^{-5}$ mm/mm/° C.) to about 7 (10$^{-5}$ mm/mm/° C.).

10. The composition of claim 1, wherein the composition has a flex modulus greater than about 1,500 MPa and less than about 2,200 MPa.

11. The composition of claim 1, wherein the as-molded shrinkage percentage of the composition is from about 0.5 percent to about 0.8 percent.

12. The composition of claim 1, wherein the after-bake mold shrinkage percentage of the composition is from about 0.7 percent to about 0.9 percent.

13. The composition of claim 1, wherein the 100% ductility failure occurs under multiaxial impact at speed of 2.2 m/s at −30° C. without paint.

14. An article formed from the composition of claim 1.

15. The article of claim 14, wherein the article is a part of an automobile.

16. A method of forming an article comprising:
melt blending a polyolefin comprising:
  (a) a polyolefin comprising a polypropylene homopolymer, a propylene-ethylene block copolymer, or combinations thereof, wherein the polyolefin is present in an amount ranging from about 55 wt. % to about 72 wt. %, based on a total weight of the composition;
  (b) a first and a second elastomer that are not the same, wherein the combined weight percent of the first elastomer and the second elastomer ranges from about 18 wt. % to about 33 wt. %, based on the total weight of the composition wherein: (i) the first elastomer comprises an ethylene-based copolymer having a density from about 0.86 g/cm$^3$ to about 0.88 g/cm$^3$, wherein the first elastomer is present in an amount ranging from about 5 wt. % to about 15 wt. %, based on the total weight of the composition; and (ii) the second elastomer comprises an ethylene-octene copolymer having a density from about 0.85 g/cm$^3$ to about 0.87 g/cm$^3$ and a glass transition temperature below −60° C., wherein the second elastomer is present in an amount ranging from about 10 wt. % to about 22 wt. %, based on the total weight of the composition;
  (c) a filler present in an amount ranging from about 6 wt. % to about 12 wt. %, based on the total weight of the composition; and
  (d) an additive package present in an amount ranging from about 0.5 wt. % to about 5 wt. %, based on the total weight of the composition;
wherein the composition has a density ranging from about 0.92 to about 0.99 g/cm$^3$, an after-bake-mold-shrinkage (1 hours, 121° C.) ranging from about 0.7 percent to about 0.9 percent, a coefficient of linear thermal expansion ranging from about 5 to about 8 (10E-5 mm/mm/° C.), and a flexural modulus between about 1,400 MPa and about 2,500 MPa.
pelletizing said melt blend of polyolefin; and,
injection molding said pelletized blend.

17. The method of claim 16, wherein said article is a part of an automobile.

* * * * *